(12) United States Patent
Fan

(10) Patent No.: US 7,903,390 B2
(45) Date of Patent: Mar. 8, 2011

(54) BIPOLAR MEMBRANE FOR ELECTROCHEMICAL SUPERCAPACITORS AND OTHER CAPACITORS

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 421 days.

(21) Appl. No.: 12/142,317

(22) Filed: Jun. 19, 2008

(65) Prior Publication Data
US 2009/0316336 A1 Dec. 24, 2009

(51) Int. Cl.
*H01G 9/00* (2006.01)
(52) U.S. Cl. ......... 361/502; 361/503; 361/504; 361/509; 361/512; 361/523
(58) Field of Classification Search .............. 361/502, 361/503–504, 509–512, 523–529, 516–519, 361/540
See application file for complete search history.

(56) References Cited

U.S. PATENT DOCUMENTS

| | | | |
|---|---|---|---|
| 4,766,161 A | 8/1988 | Chlanda et al. | |
| 5,079,674 A | 1/1992 | Malaspina | |
| 5,776,384 A | 7/1998 | Firsich et al. | |
| 6,064,562 A * | 5/2000 | Okamura | 361/502 |
| 6,198,620 B1 | 3/2001 | Wei et al. | |
| 6,262,879 B1 * | 7/2001 | Nitta et al. | 361/517 |
| 6,426,862 B1 * | 7/2002 | Vasechkin et al. | 361/502 |
| 6,614,646 B2 * | 9/2003 | Bogaki et al. | 361/502 |
| 7,323,265 B2 | 1/2008 | Fan et al. | |
| 7,511,943 B2 * | 3/2009 | Fife et al. | 361/516 |
| 7,583,494 B2 * | 9/2009 | Maeshima | 361/502 |
| 7,706,129 B2 * | 4/2010 | Hirose et al. | 361/502 |
| 2005/0103634 A1 | 5/2005 | Andelman et al. | |

* cited by examiner

*Primary Examiner* — Nguyen T Ha
(74) *Attorney, Agent, or Firm* — Mark E. Fejer

(57) ABSTRACT

A supercapacitor having a bipolar membrane separator having a first side facing the negative electrode of the supercapacitor and having a plurality of cations and a second side facing the positive electrode and having a plurality of anions.

7 Claims, 7 Drawing Sheets

BIPOLAR MEMBRANE FOR ELECTROCHEMICAL SUPERCAPACITORS AND OTHER CAPACITORS

BACKGROUND OF THE INVENTION

1. Field of the Invention

This invention relates to a device for storing energy. In one aspect, this invention relates to capacitors and supercapacitors. In another aspect, this invention relates to a method and means for reducing or eliminating the self-discharge of capacitors and supercapacitors.

2. Description of Related Art

A capacitor, also referred to as a condenser, is an electric circuit element used to store charge (energy) temporarily, consisting in general of two metallic plates, i.e. positive and negative electrodes, separated and insulated from each other by a dielectric. In a conventional capacitor, energy is stored by the removal of charge carriers, typically electrons, from one metal plate and depositing them on the other metal plate. This charge separation creates a potential between the two plates, which can be harnessed in an external circuit. The total energy stored in this fashion (capacitance) is a combination of the number of charges stored and the potential between the plates. The former is essentially a function of size and the material properties of the plates, whereas the latter is limited by the dielectric breakdown between the plates. Various materials can be inserted between the plates to enable higher voltages to be stored, leading to higher energy densities for any given size.

Supercapacitors, also known as electric double-layer capacitors (DLC), electrochemical double layer capacitors (EDLC), or ultracapacitors, are electrochemical capacitors that have an unusually high energy density when compared with conventional capacitors, typically on the order of thousands of times greater than a high-capacity electrolytic capacitor. In contrast with conventional capacitors, supercapacitors do not have a conventional dielectric, as such. Rather, they are based on a structure that contains an electrical double layer. FIG. 1 shows a comparison of a conventional capacitor and a supercapacitor.

Energy storage in a capacitor is by means of a static charge rather than by an electrochemical process that is inherent to batteries. Applying a voltage differential on the positive and negative electrodes charges the capacitor or supercapacitor. However, whereas a conventional capacitor consists of conductive foils and a dry separator, supercapacitors employ special electrodes and some electrolyte.

In an electric double-layer capacitor, the effective thickness of the "dielectric" is exceedingly thin—on the order of nanometers—and that, combined with the very large surface area, is responsible for their extraordinarily high capacitances in practical sizes. In an electrical double layer, each layer by itself is quite conductive, but the physics at the interface where the layers are effectively in contact means that no significant current can flow between the layers. However, the double layer can withstand only a low voltage, which means that supercapacitors rated for higher voltages must be made of matched series-connected individual supercapacitors.

In general, supercapacitors improve storage density through the use of a nanoporous material, typically activated carbon, in place of the conventional insulating barrier. Activated carbon is a powder made up of extremely small and very "rough" particles, which, in bulk, form a low-density volume of particles with holes between them that resembles a sponge. The overall surface area of even a thin layer of such a material is many times greater than a traditional material like aluminum, allowing many more electrons to be stored in any given volume. The disadvantage of using activated carbon is that the carbon is taking the place of the improved insulators used in conventional devices, as a result of which supercapacitors employ low potentials on the order of only 2 to 3 V.

There are three types of materials suitable for use as electrodes in a supercapacitor—high surface area activated carbons, metal oxides, and conducting polymers. The high surface area electrode material is the most common and least costly to manufacture. In a double layer capacitor, energy is stored in a double layer formed near the carbon electrode surface. The electrolyte employed in a double layer capacitor may be aqueous or organic. Using an aqueous electrolyte provides low internal resistance but limits the voltage to about 1 volt. In contrast thereto, using an organic electrolyte provides about 2.5 volts of charge but the internal resistance is high. Thus, to operate at higher voltages, supercapacitors may be connected in series. The gravimetric energy density of the supercapacitor is about 1 to 10 Wh/kg, which is high compared with conventional capacitors but constitutes only about one-tenth of the energy density of a nickel-metal-hydride battery. Whereas the electrochemical battery delivers a fairly steady voltage in the usable energy spectrum, the voltage of the supercapacitor is linear and drops evenly from full voltage to zero volts. As a result, supercapacitors are unable to deliver a full charge. Thus, supercapacitors have high power densities (W/kg) but low energy density (Wh/kg).

Definitions

Capacitance C is defined as the ratio of stored positive charge Q to the applied voltage V. Thus $$C = Q/V \tag{1}$$

For a conventional capacitor, C is directly proportional to the surface area A of each electrode and inversely proportional to the distance D between the electrodes. Thus $$C = \epsilon_0 \epsilon_1 A/D \tag{2}$$

where $\epsilon_0$ is the dielectric constant of free space and $\epsilon_1$ is the dielectric constant of the insulating material between the electrodes.

The Energy E stored in a capacitor is directly proportional to its capacitance. Thus $$E = \tfrac{1}{2} C V^2 \tag{3}$$

The maximum power $P_{max}$ of a capacitor is inversely proportional to the capacitor internal resistance ($R_i$), which includes the resistance from current collectors, electrodes, and dielectric materials. Thus $$P_{max} = V^2/(4R_i) \tag{4}$$

From equations (1)-(3), in order to obtain high power density in the capacitor, several methods, such as increasing electrode surface area, decreasing the distance between the electrodes, using high dielectric constant materials, and increasing applied voltage may be used. However, these methods negatively affect the lifetime of the capacitors. For example, shortening the distance between the electrodes increases the chance of recombination of the stored charges, i.e. self-discharge; increasing the electrode surface area increases the electrode material corrosion rate; and high dielectric constant material increases the internal resistance.

Of the above listed problems, self-discharge of the capacitor is the most significant. Self-discharge not only affects the energy efficiency of the supercapacitor due to loss of charge, but also may affect the lifetime of the supercapacitor due to consumption of matter. Whether or not there is an influence on lifetime crucially depends on the mechanisms of self-discharge. There are at least two possible pathways: reaction-rate controlled leakage by irreversible decomposition of electrode material or electrolyte solution, and diffusion-limited leakage by a redox couple, giving rise to a shuttle transport between the two electrodes. In the latter case, the redox species may be an impurity, e.g. $Fe^{3+}/Fe^{2+}$, or an intrinsic redox couple, being produced by reversible conversion of electrode material or electrolyte solution, e.g. $H^+/H_2$. If self-discharge is due to an irreversible electrode reaction, then the electrode material and/or electrolyte solution are consumed and reaction products are accumulated inside the cell according to Faraday's law. Clearly, this kind of process will affect the lifetime of the capacitor. On the other hand, if self-discharge proceeds via the shuttle mechanism, there is no net consumption of matter and, thus, no aging.

SUMMARY OF THE INVENTION

It is, thus, one object of this invention to provide a method and apparatus for reducing or, possibly even eliminating, the self-discharge of capacitors, and, in particular, supercapacitors for energy storage.

This and other objects of this invention are addressed in an energy storage device having a positive electrode, a negative electrode, and a separator element disposed between the positive electrode and negative electrode, wherein the separator element comprises a bipolar element having a first side facing the negative electrode and comprising a plurality of cations and having a second side facing the positive electrode and comprising a plurality of anions. In accordance with one preferred embodiment of this invention, the bipolar element is a multi-layer bipolar membrane comprising an anion-permeable membrane layer facing the positive electrode and a cation-permeable membrane layer facing the negative electrode. When disposed in an aqueous solution, it is possible by imposing a potential field across the membrane to split water into protons and hydroxyl ions. This results in the production of acidic and basic solutions at the surface of the bipolar membrane.

The anion and cation permeable layers of the bipolar membrane enable the selective transport of anions and cations, i.e. anions in the cation selective layer, and cations in the anion selective layer and block co-ions from reaching the contact region and the opposite side of the membrane. This special feature enables the supercapacitor to maintain the separation of charges with little or no recombination. That is, the bipolar membrane builds its own electrical field to become a sub-capacitor with the external electrical field.

BRIEF DESCRIPTION OF THE DRAWINGS

These and other objects of this invention will be better understood from the following detailed description taken in conjunction with the drawings wherein.

DETAILED DESCRIPTION OF THE PRESENTLY PREFERRED EMBODIMENTS

The invention disclosed herein provides a means for reducing or possibly eliminating the self-discharge of capacitors and is of particular interest for use in connection with supercapacitors. In accordance with one preferred embodiment, this invention involves the use of a bipolar membrane as a separator disposed between the positive and negative electrodes of the capacitor as well as an electrolyte holder. In operation, the bipolar membrane provides two functions—providing a separation between the capacitor electrodes and working as a capacitor to increase the capacitor power density. To minimize the self-discharge rate of the capacitor, the gap between the electrodes should be as small as possible. The bipolar membrane employed in this invention may be as thin as 1 mil (25 μm) to reduce internal resistance. In addition, the membrane is flexible so as to enable capacitor scale-up.

Figure 1:
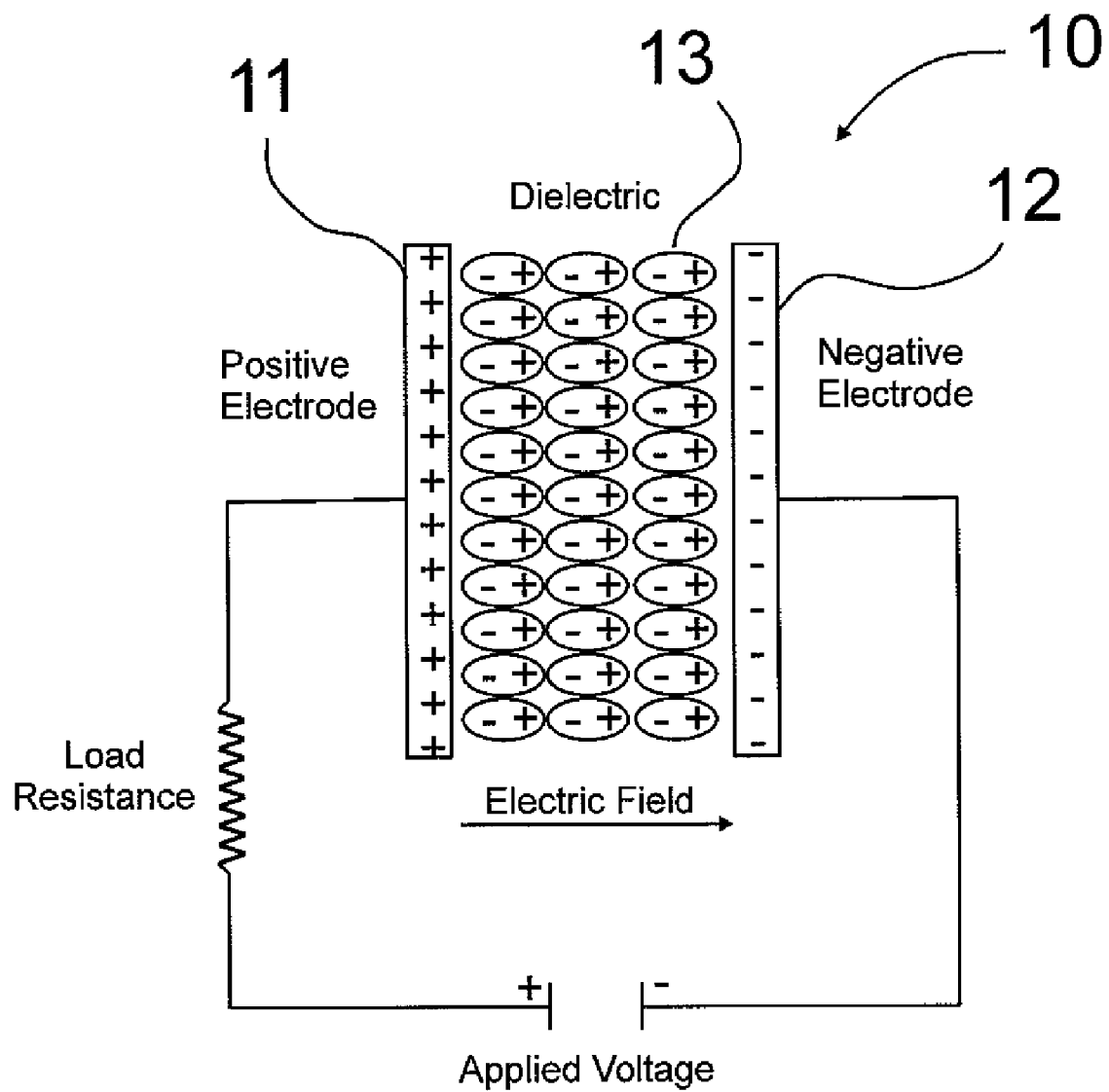
FIGS. 1 and 2 are schematic diagrams showing a comparison of a conventional capacitor and a supercapicitor, respectively.
Figure 2:
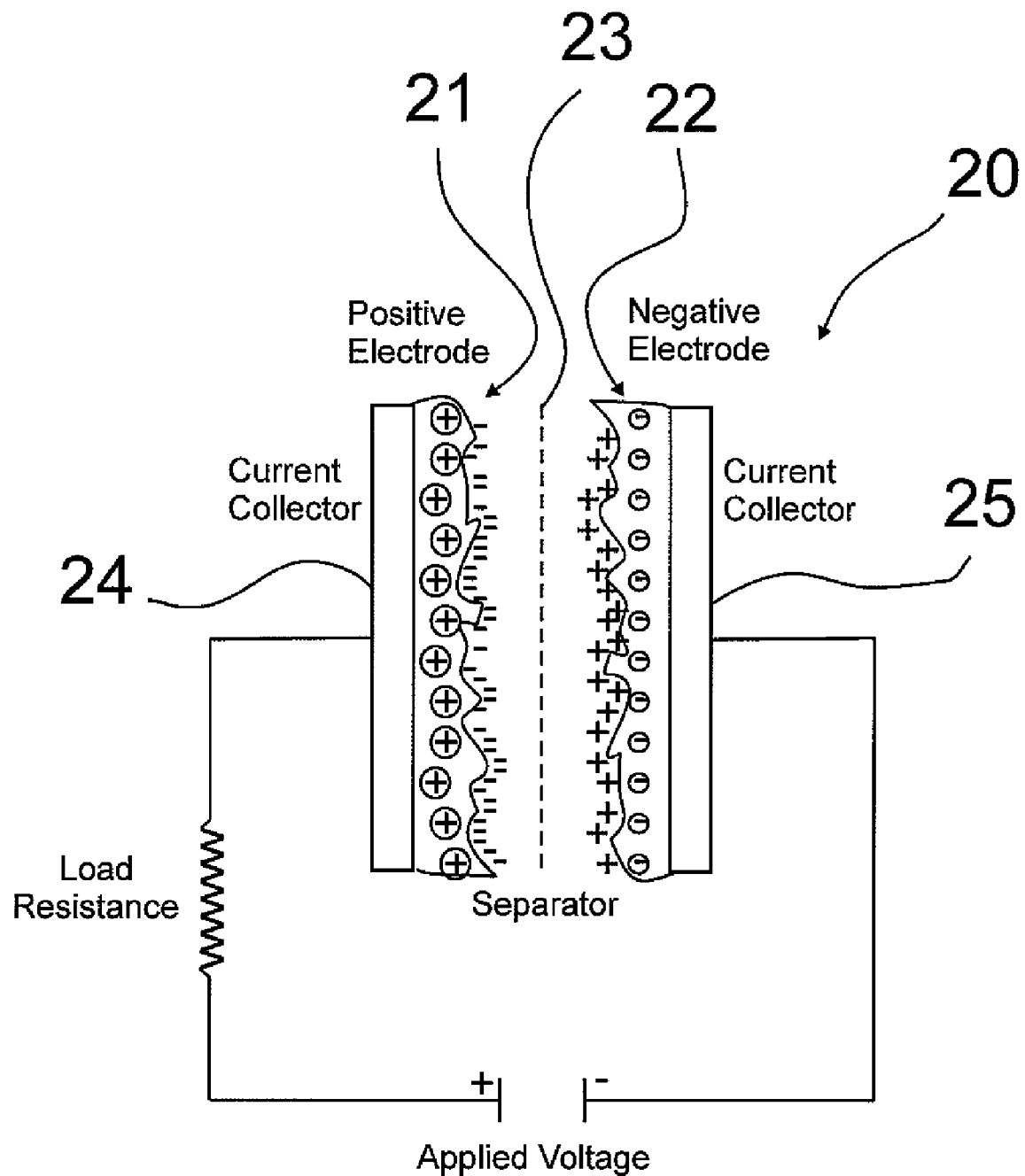

FIGS. 1 and 2 show a comparison between two different types of capacitors—a conventional capacitor 10 and a supercapacitor 20. As shown therein, conventional capacitor 10 comprises positive electrode (cathode) 11, negative electrode (anode) 12 and dielectric 13 disposed between the electrodes. In contrast thereto, supercapacitor 20 comprises positive electrode 21, negative electrode 22 and dielectric separator 23, all of which are disposed in a liquid electrolyte which permits ionic but not electronic conductivity, such as water, dilute acid, dilute bases or organics. Current collectors 24, 25 may be employed as shown, if desired. Applying an electric potential across the electrodes causes charge to build up in the double layer which exists at the electrode/electrolyte interface.

Figure 3:
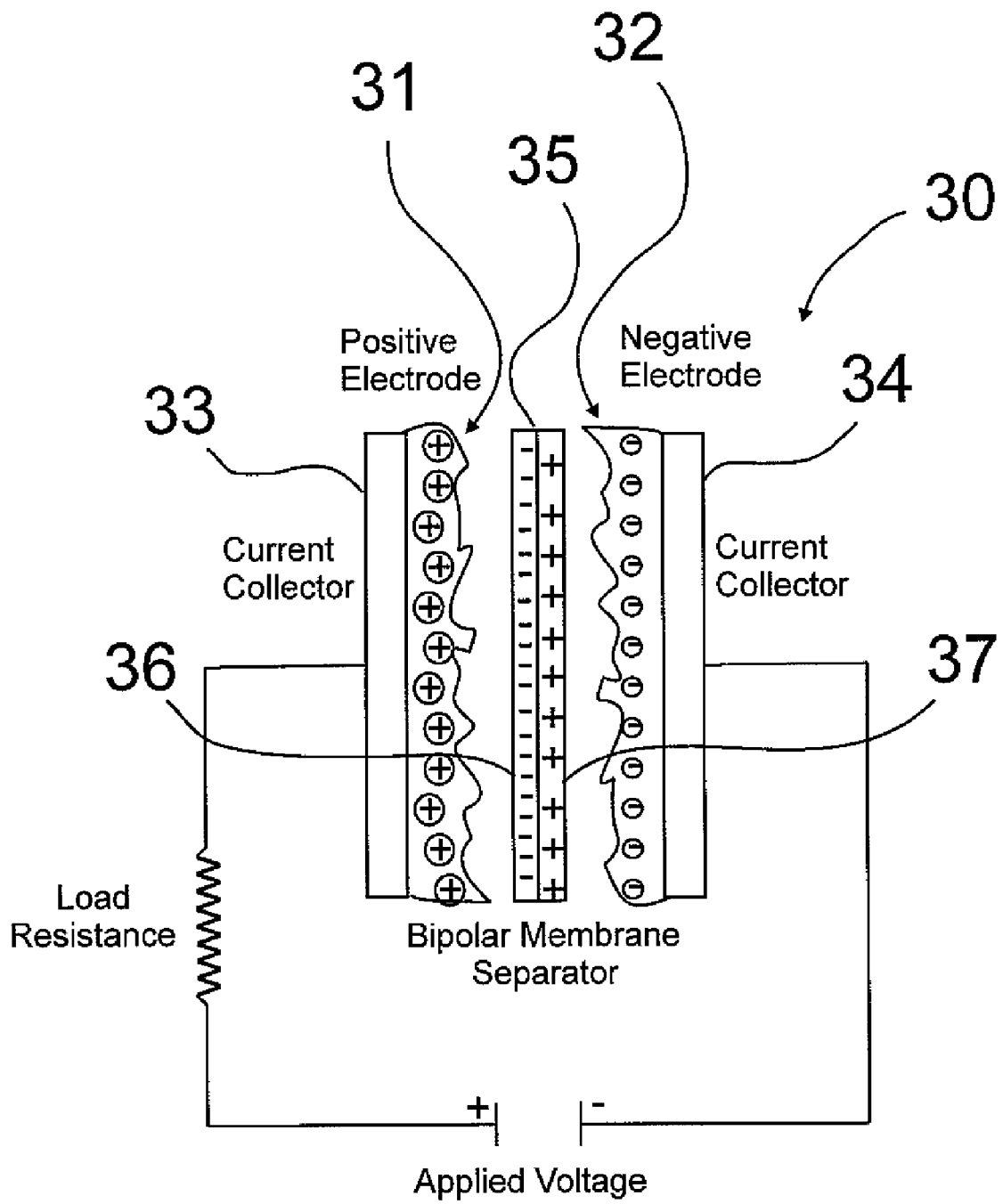
FIG. 3 is a schematic diagram of a supercapacitor in accordance with one embodiment of this invention comprising a bipolar membrane separator.
Figure 4:
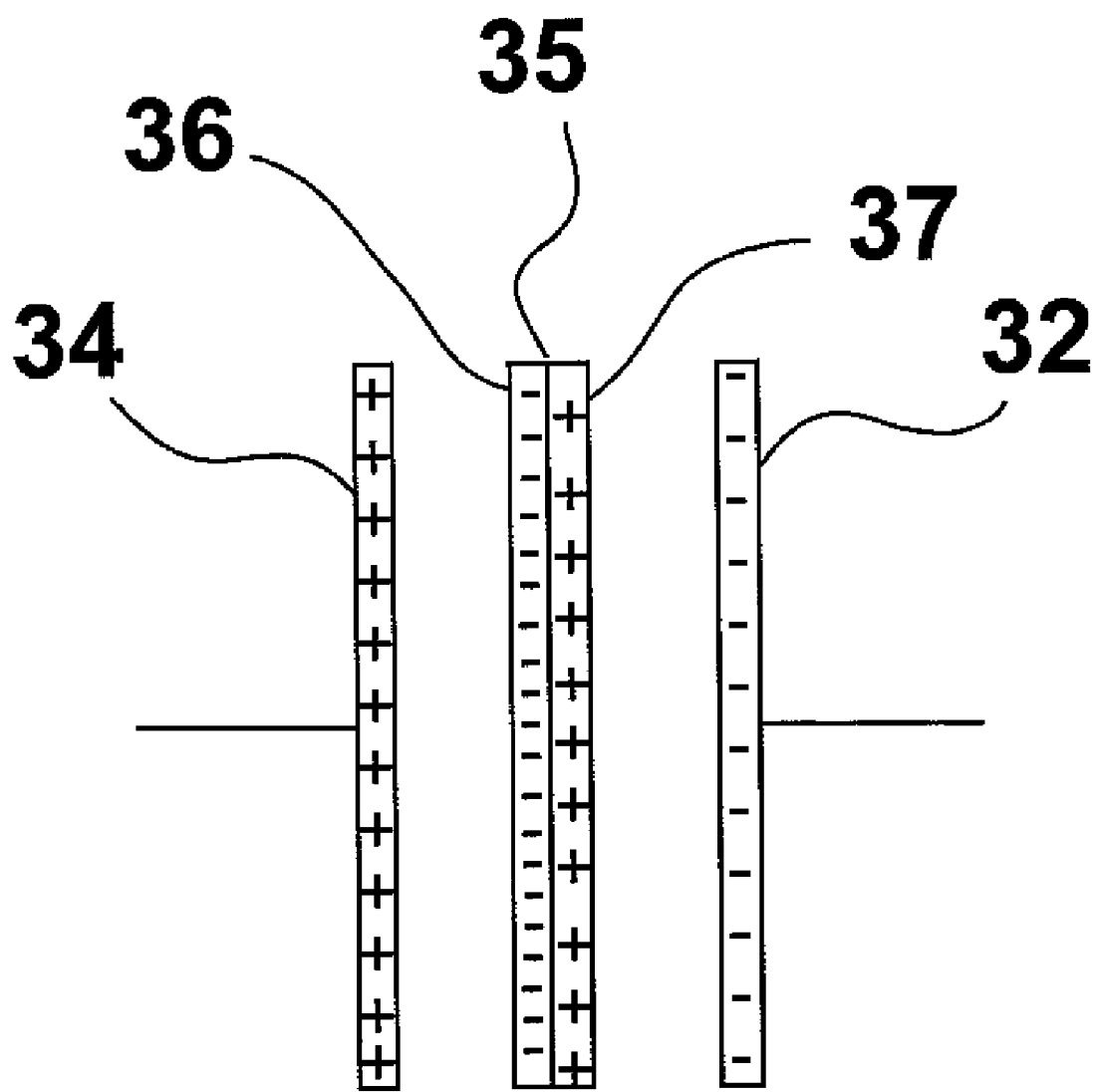
FIG. 4 is an enlarged view of the electrodes and bipolar membrane separator in accordance with one embodiment of this invention.

FIG. 3 shows a supercapacitor 30 in accordance with one embodiment of this invention comprising positive electrode 31, negative electrode 32, current collectors 33, 34 and bipolar membrane separator 35. Bipolar membrane separator 35 comprises anion-permeable membrane layer 36 and cation-permeable membrane layer 37 connected together to form a single composite membrane structure. The composite structure is oriented with respect to the electrodes such that the cation-permeable membrane layer 37 faces the negative electrode 32 and the anion-permeable membrane layer 36 faces the positive electrode 31. FIG. 4 shows an enlarged view of a supercapacitor in accordance with one embodiment of this invention with the bipolar membrane as the separator and electrolyte holder. It will be appreciated that insertion of the bipolar membrane makes the supercapacitor function as two capacitors in series, thus increasing the supercapacitor voltage.

As previously indicated, supercapacitors may utilize either an aqueous or organic electrolyte. Aqueous electrolytes, such as $H_2SO_4$ and KOH, generally have low resistance $R_i$. Organic electrolytes, such as acetonitrile, require higher electrode pore sizes. Because the electrolyte forms anions and cations when the supercapacitor is charged and because the distance between the electrodes is very small, the anion and cation recombination is the primary cause of self-discharge. The bipolar membrane of the supercapacitor of this invention acts as both an anion and cation separator and an electrode separator.

The ion permeable membranes employed in the making of the bipolar membrane are essentially sheets of ion-exchange resins that usually contain other polymers to improve mechanical strength and flexibility. The resin component of the cation-exchange membrane will have negatively charged groups (e.g. $SO_3^-$) chemically attached to the polymer chains (e.g. styrene/divinylbenzene copolymers). Ion-exchange polymers such as poly(styrene sulfonic acid) are water soluble; thus cross-linking is required to prevent dissolution of the ion permeable membranes. See, for example, U.S. Pat. No. 7,323,265, which is incorporated by reference herein in its entirety. Ions with a charge opposite to the fixed charge (counter ions) are freely exchanged at these sites. The concentration of counter ions (e.g. $Na^+$) is relatively high. Thus, counter ions carry most of the electric current through the membrane. The fixed charges attached to the polymer chains repel ions of the same charge (co-ions), in the instant case the anions. Because the concentration of anions in the membrane is relatively low, they carry only a small fraction of the electric current through a cation permeable membrane. Attachment of positive fixed charges (e.g. $-NR_3^+$ or $C_5H_5N+R$ where typically $R=H$, $CH_3$ or combinations thereof) to the polymer chains forms anion permeable membranes, which are selective to the transport of negative ions because the fixed $-NR_3^+$ groups repel positive ions.

Bipolar membranes suitable for use in the supercapacitors of this invention may be made by dip-coating, tape casting, or laminating two cation and anion exchange membranes together. In accordance with one embodiment of this invention, the bipolar membranes are constructed from a matrix of anion and cation exchange polymers. U.S. Pat. No. 4,766,161 teaches bipolar membranes that exhibit high permselectivity and long term stability which are suitable for use in this invention.

EXAMPLE 1

Supercapacitors without Bipolar Membranes

Figure 5:
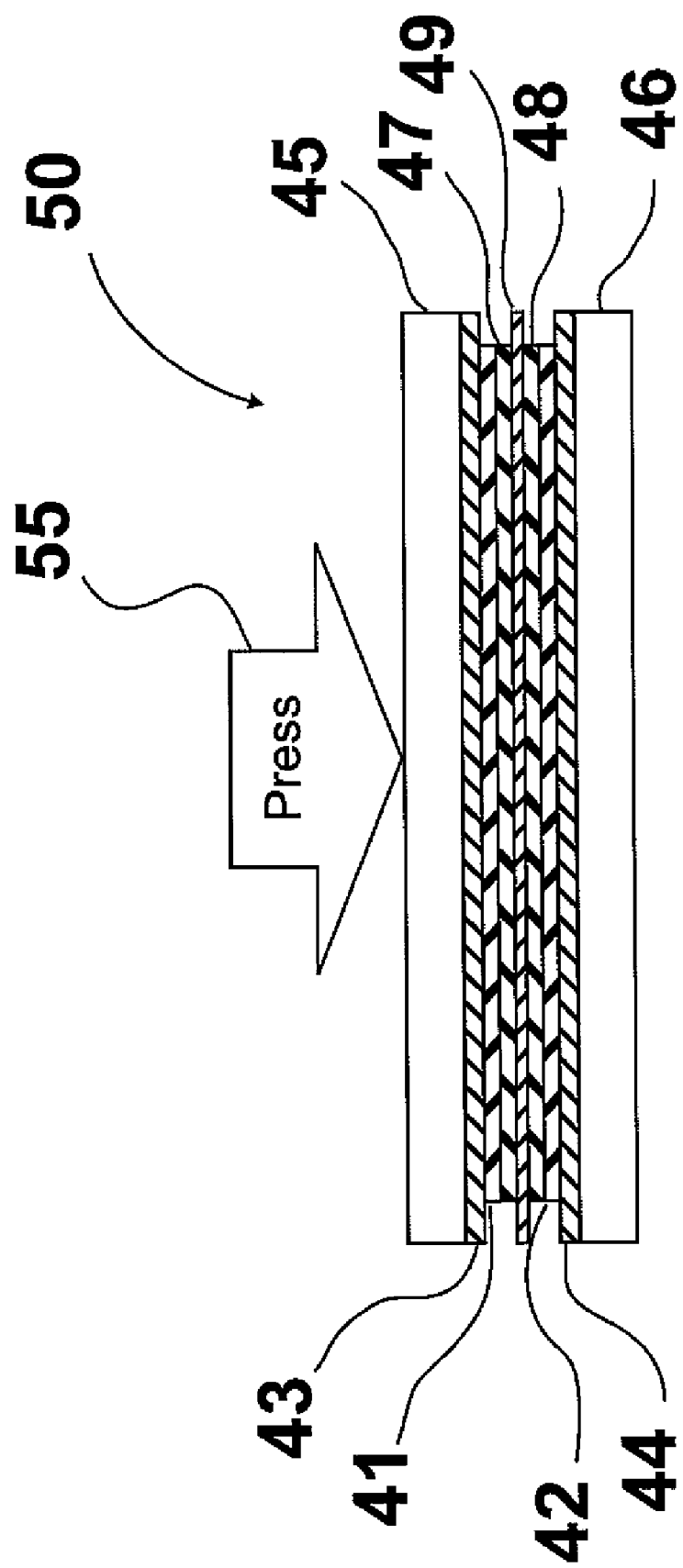
FIG. 5 is a schematic diagram of a test supercapacitor.
Figure 6:
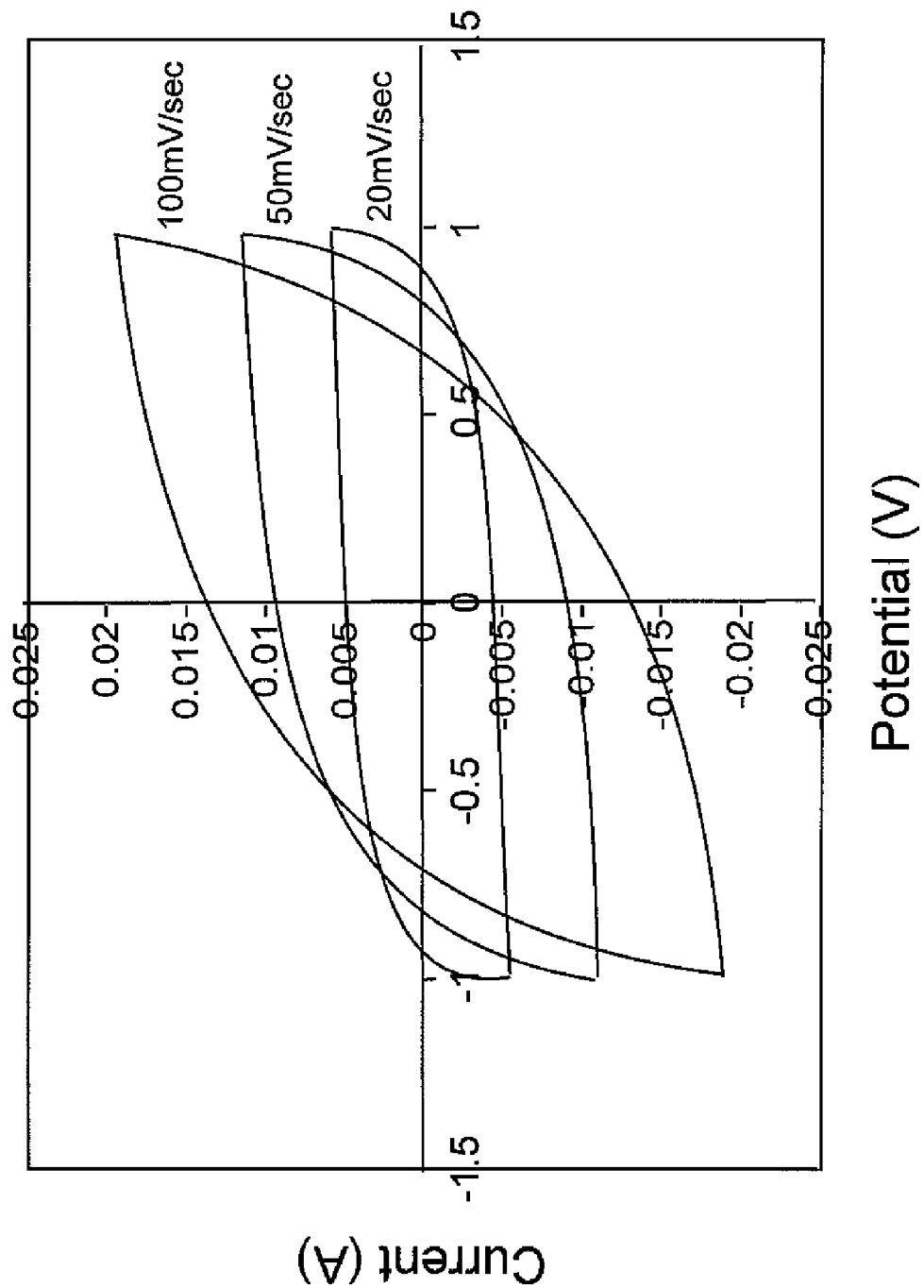
FIG. 6 is a diagram showing the cyclic voltamograms derived from capacitance testing of the supercapacitor.

In this example, graphite samples were made into a slurry with isopropanol and TEFLON® solution, table cast onto aluminum foil and heat treated at 365° F. for one hour. The resulting electrode contained about 40% by weight TEFLON as a binder. The foil 41, 42 was cut into 2" by 2" squares and sandwiched between gasket material 43, 44 and garolite plates 45, 46, forming a capacitor 50 as shown in FIG. 5 which was tested for double layer capacitance in a press. The capacitor was composed of two identical electrodes 47, 48 facing each other and separated by a piece of manila paper 49 having a thickness of about 4 mils. One gram of tetraethylammonia-hexaflorophosphate ($TEAPF_6$) dissolved in 10 ml of acetonitrile resulting in a $TEAPF_6$ concentration of about 11.5% was used as electrolyte. The pressure of the press 55 was maintained at 5 psig throughout the test. Cyclic voltamograms were taken between −1 to about +1V at a scan rate of 100 mV/sec, 50 mV/sec, and 20 mV/sec. At each scan rate, four cycles were recorded. Double layer currents at zero potential were taken, averaged for the four scans, and the resulting data plotted (FIG. 6). A linear regression was performed for the points on the plots of double layer current vs. scan rate, the slope of which is the double layer capacitance for the supercapacitor at zero voltage. Capacitance test results are summarized in Table 1.

TABLE 1

Measured Capacitance From Capacitors Using Different Materials

| Samples | Capacitance ($\mu F/cm^2$) | Capacitance (mF/g) |
|---|---|---|
| A | 142.95 | 14.295 |
| B | 41.2 | 4.12 |
| C | 13.5 | 1.35 |
| D | 4007.8 | 400.78 |

EXAMPLE 2

Supercapacitor with Bipolar Membrane

Figure 7:
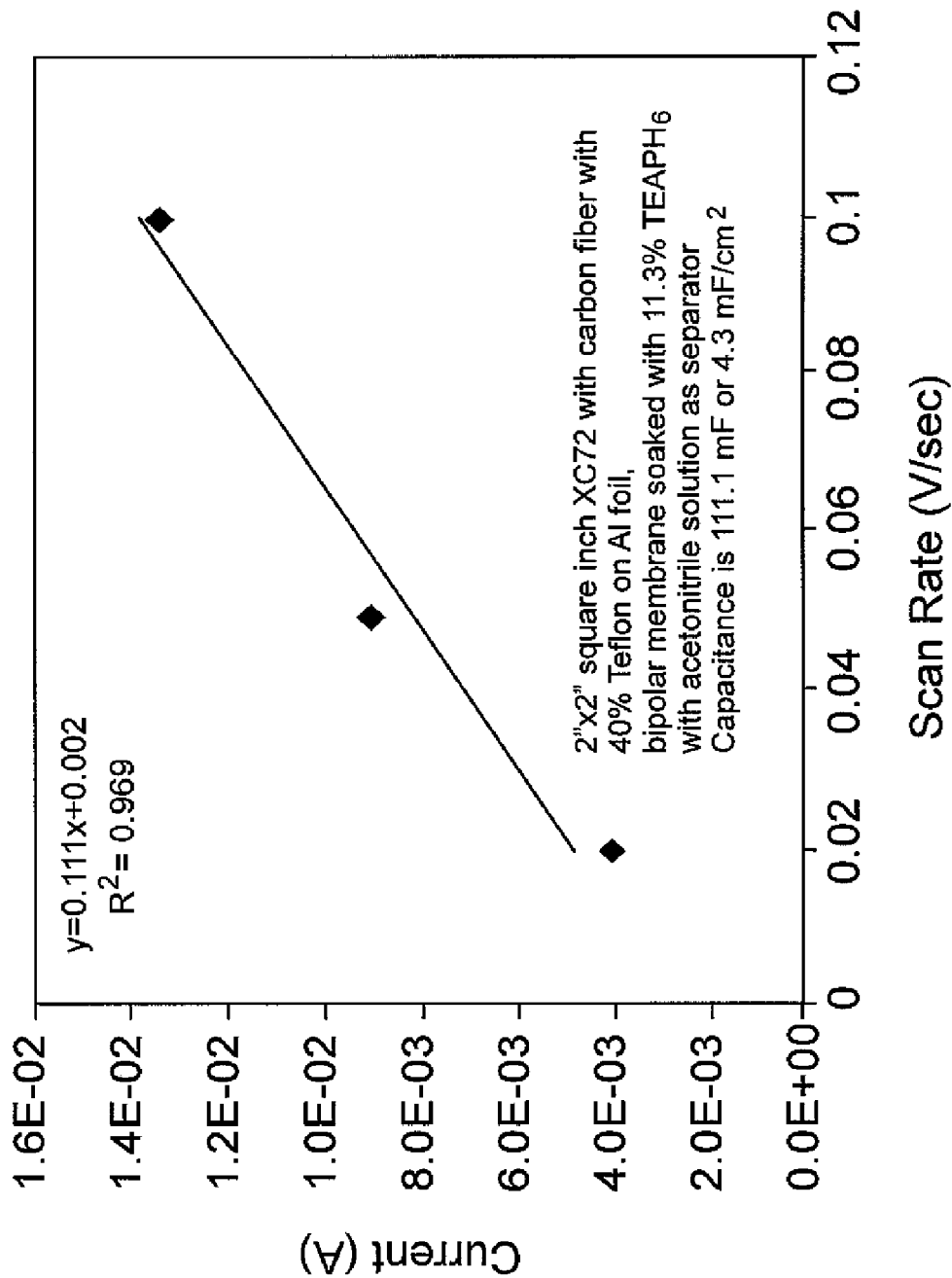
FIG. 7 is a diagram of showing the capacitance derived from the data of FIG. 6.

A bipolar membrane was constructed from an anion exchange membrane and a cation exchange solution by way of a method in which the anion exchange membrane, e.g. polyolefin-amine based anion exchange membrane from Tokuyama, Japan having a thickness of about 25 μm, was spray coated with a 5 wt % NAFION® solution to form a NAFION layer having a thickness of about 1 μm. After drying at room temperature for about 12 hours, the resulting bipolar membrane was soaked in an electrolyte solution containing 1 gram of $TEAPF_6$ dissolved in 10 ml of acetonitrile for 3 hours. The soaked bipolar membrane was placed between the two electrodes using XC72 carbon in the same manner as described in Example 1 to replace the manila paper as a separator. Cyclic voltamograms were taken between −1 to +1V at a scan rate of 100 mV/sec, 50 mV/sec, and 20 mV/sec. As before, at each scan rate, four cycles were recorded. Double layer currents at zero potential were taken, averaged for the four scans, and the resulting data plotted. A linear regression was performed for the points on the plots of double layer current vs. scan rate, the slope of which is the double layer capacitance for the supercapacitor at zero voltage. The results, seen in FIG. 7, surprisingly show that the capacitance was 4.3 $mF/cm^2$, an increase of about 7.5%.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. In an energy storage device having a positive electrode, a negative electrode, and a separator element disposed between said positive electrode and said negative electrode disposed within a container, the improvement comprising:
    said separator element comprising a bipolar element having a first side facing said negative electrode and comprising a plurality of cations and a second side facing said positive electrode and comprising a plurality of anions.

2. The energy storage device of claim 1, wherein said bipolar element is a multi-layer bipolar membrane.

3. The energy storage device of claim 2, wherein said multi-layer bipolar membrane comprises an anion-permeable layer facing said positive electrode and a cation-permeable layer facing said negative electrode.

4. The energy storage device of claim 1, wherein said bipolar element comprises an anion-permeable membrane layer facing said positive electrode and a cation-permeable membrane layer facing said negative electrode.

5. The energy storage device of claim 1 further comprising an electrolyte disposed within said container.

6. The energy storage device of claim 5, wherein said electrolyte comprises an aqueous solution.

7. The energy storage device of claim 5, wherein said electrolyte comprises an organic material.

* * * * *

UNITED STATES PATENT AND TRADEMARK OFFICE
CERTIFICATE OF CORRECTION

PATENT NO.        : 7,903,390 B2                                         Page 1 of 1
APPLICATION NO.   : 12/142317
DATED             : March 8, 2011
INVENTOR(S)       : Qinbai Fan It is certified that error appears in the above-identified patent and that said Letters Patent is hereby corrected as shown below:

Col. 4, line 4 to Col. 4, line 5 delete the text "derived from the data of FIG. 6" and in its place insert --of the supercapacitor with a bipolar membrane--

Signed and Sealed this
Twenty-first Day of June, 2011

David J. Kappos
*Director of the United States Patent and Trademark Office*